Patented Sept. 26, 1922.

1,430,304

UNITED STATES PATENT OFFICE.

HENRY DREYFUS, OF LONDON, ENGLAND.

MANUFACTURE OF ACETIC ANHYDRIDE.

No Drawing. Application filed May 24, 1921. Serial No. 472,283.

(GRANTED UNDER THE PROVISIONS OF THE ACT OF MARCH 3, 1921, 41 STAT. L., 1313.)

*To all whom it may concern:*

Be it known that I, HENRY DREYFUS, of London, England, have invented certain new and useful Improvements Relating to the Manufacture of Acetic Anhydride (for which I have filed applications in France, 478,951, June 30, 1914; in Switzerland Dec. 11, 1914; in Italy June 5, 1917, and in Great Britain Dec. 13, 1919), of which the following is a specification.

I have found that salts of pyrosulfuric acid, such for example as sodium prosulfate ($Na_2S_2O_7$) produced by the known method of heating the bisulfate to decompose it into pyrosulfate with elimination of water, can be employed for the manufacture of acetic anhydride by bringing them into reaction with salts of acetic acid. The reaction takes place in such a way that by heating, the salt of pyrosulfuric acid combines with the salt of acetic acid, forming a neutral salt of sulfuric acid. By employing for example pyrosulfate of sodium and anhydrous acetate of sodium, preferably in powder, sulfate of sodium and acetic anhydride are obtained. The reaction is effected by mixing intimately, excluding any trace of moisture. The sodium acetate is believed to react in chemically equivalent quantities according to the equation

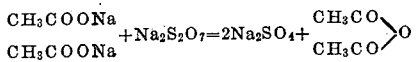

but it is preferable to employ an excess of the sodium pyrosulfate. The reaction takes place on heating. The acetic anhydride formed may distil off in porportion as the reaction proceeds.

The reaction is preferably performed in the presence of diluents such as glacial acetic acid or acetic anhydride or mixtures thereof, in which case one has a still more intimate mixture.

As compared with previously known processes the present invention presents the advantage that it is not necessary to cool, but on the contrary it is necessary to heat, which simplifies both the apparatus and the process of manufacture. Moreover pyrosulfate of sodium is much cheaper than the materials hitherto employed for the manufacture of acetic anhydride. In particular I can employ the pyrosulfate of sodium obtained by the method of strongly heating acid sodium sulfate, $NaHSO_4$, which decomposes into pyrosulfate of sodium and water.

Instead of acetate of sodium other salts of acetic acid may be employed.

What I claim and desire to secure by Letters Patent is:—

1. Process for the manufacture of acetic anhydride comprising bringing a salt of acetic acid into reaction with a pyrosulfate.

2. Process for the manufacture of acetic anhydride, comprising bringing a salt of acetic acid into reaction with a pyrosulfate in intimate mixture therewith in presence of a diluent.

3. Process for the manufacture of acetic anhydride, comprising bringing a salt of acetic acid into reaction with a pyrosulfate in intimate mixture therewith in presence of a substantially water-free acetic liquid incapable of reacting with acetic anhydride.

4. In a process for the manufacture of acetic anhydride, mixing a salt of acetic acid and a pyrosulfate in presence of a diluent and applying heat to the mixture.

5. In a process for the manufacture of acetic anhydride, mixing a salt of acetic acid and pyrosulfate in presence of a substantially water-free acetic liquid incapable of reacting with acetic anhydride and applying heat to the mixture.

6. Process for the manufacture of acetic anhydride, comprising bringing sodium acetate into reaction with sodium pyrosulfate.

7. In a process for the manufacture of acetic anhydride, mixing sodium acetate and sodium pyrosulfate in presence of a diluent and applying heat to the mixture.

8. In a process for the manufacture of acetic anhydride, mixing sodium acetate and sodium pyrosulfate, in presence of a substantially water-free acetic liquid incapable of reacting with acetic anhydride, and applying heat to the mixture.

9. In a process for the manufacture of acetic anhydride, mixing sodium acetate and sodium pyrosulfate in presence of glacial acetic acid and applying heat to the mixture.

10. Process for the manufacture of acetic anhydride, comprising bringing a salt of acetic acid into reaction with pyrosulfate obtained by heating a bisulfate.

11. Process for the manufacture of acetic anhydride, comprising bringing a salt of acetic acid into reaction with pyrosulfate obtained by heating a bisulfate, the reaction being performed in intimate mixture.

12. Process for the manufacture of acetic anhydride, comprising bringing a salt of acetic acid into reaction with pyrosulfate obtained by heating a bisulfate, the reaction being performed in intimate mixture in presence of a diluent.

13. Process for the manufacture of acetic anhydride, comprising bringing a salt of acetic acid into reaction with pyrosulfate obtained by heating a bisulfate, the reaction being performed in intimate mixture in presence of a substantially water-free acetic liquid incapable of reacting with acetic anhydride.

14. Process for the manufacture of acetic anhydride, comprising bringing a salt of acetic acid into reaction with pyrosulfate obtained by heating a bisulfate, the reaction being performed in intimate mixture in presence of glacial acetic acid.

15. In a process for the manufacture of acetic anhydride mixing a salt of acetic acid in presence of a diluent, with pyrosulfate obtained by heating bisulfate, and applying heat to the mixture.

16. In a process for the manufacture of acetic anhydride, mixing a salt of acetic acid, in presence of a substantially water-free acetic liquid incapable of reacting with acetic anhydride, with pyrosulfate obtained by heating bisulfate, and applying heat to the mixture.

17. In a process for the manufacture of acetic anhydride, mixing a salt of acetic acid, in presence of glacial acetic acid, with pyrosulfate obtained by heating bisulfate, and applying heat to the mixture.

18. Process for the manufacture of acetic anhydride, comprising bringing sodium acetate into reaction with sodium pyrosulfate obtained by heating sodium bisulfate.

19. Process for the manufacture of acetic anhydride, comprising bringing sodium acetate and sodium pyrosulfate obtained by heating sodium bisulfate into reaction in intimate mixture.

20. Process for the manufacture of acetic anhydride, comprising bringing sodium acetate and sodium pyrosulfate obtained by heating sodium bisulfate into reaction in intimate mixture, the reaction being performed in presence of a diluent.

21. Process for the manufacture of acetic anhydride, comprising bringing sodium acetate and sodium pyrosulfate obtained by heating sodium bisulfate into reaction in intimate mixture, the reaction being performed in presence of a substantially water-free acetic liquid incapable of reacting with acetic anhydride.

22. Process for the manufacture of acetic anhydride, comprising bringing sodium acetate and sodium pyrosulfate obtained by heating sodium bisulfate into reaction in intimate mixture, the reaction being performed in presence of glacial acetic acid.

23. In a process for the manufacture of acetic anhydride, mixing sodium acetate in presence of a diluent with sodium pyrosulfate obtained by heating sodium bisulfate, and applying heat to the mixture.

24. In a process for the manufacture of acetic anhydride, mixing sodium acetate, in presence of a substantially water-free acetic liquid incapable of reacting with acetic anhydride, with sodium pyrosulfate obtained by heating sodium bisulfate, and applying heat to the mixture.

25. In a process for the manufacture of acetic anhydride mixing sodium acetate in presence of glacial acetic acid with sodium pyrosulfate obtained by heating sodium bisulfate, and applying heat to the mixture.

In testimony whereof I have hereunto subscribed my name.

HENRY DREYFUS.